(12) United States Patent
Hou

(10) Patent No.: US 10,928,284 B2
(45) Date of Patent: Feb. 23, 2021

(54) IMPACT TEST METHOD AND DEVICE IN WHICH AN IMPACT APPLICATION MEMBER IS CAUSED TO FALL FREELY ONTO AND COLLIDE WITH A TEST SAMPLE

(71) Applicant: The Yokohama Rubber Co., LTD., Tokyo (JP)

(72) Inventor: Gang Hou, Hiratsuka (JP)

(73) Assignee: The Yokohama Rubber Co., LTD.

( * ) Notice: Subject to any disclaimer, the term of this patent is extended or adjusted under 35 U.S.C. 154(b) by 193 days.

(21) Appl. No.: 16/095,672

(22) PCT Filed: Feb. 22, 2017

(86) PCT No.: PCT/JP2017/006495
§ 371 (c)(1),
(2) Date: Oct. 22, 2018

(87) PCT Pub. No.: WO2017/183283
PCT Pub. Date: Oct. 26, 2017

(65) Prior Publication Data
US 2019/0128786 A1 May 2, 2019

(30) Foreign Application Priority Data

Apr. 22, 2016 (JP) .............................. JP2016-085950

(51) Int. Cl.
*G01N 3/303* (2006.01)
*G01M 7/08* (2006.01)
(Continued)

(52) U.S. Cl.
CPC .............. *G01N 3/303* (2013.01); *B65G 15/32* (2013.01); *G01M 7/08* (2013.01); *G01N 3/40* (2013.01); *G01N 2203/0033* (2013.01)

(58) Field of Classification Search
CPC .. G01N 3/303; G01N 3/40; G01N 2203/0033; G01M 7/08; B65G 15/32
See application file for complete search history.

(56) References Cited

U.S. PATENT DOCUMENTS 4,313,337 A * 2/1982 Myint ...................... G01N 3/34
73/12.13
4,331,026 A * 5/1982 Howard .................... G01N 3/42
340/680

(Continued)

FOREIGN PATENT DOCUMENTS

| CN | 1430053 | 7/2003 |
| CN | 104535407 | 4/2015 |

(Continued)

OTHER PUBLICATIONS

Machine translation of JP 10-260123 (Year: 1997).*
International Search Report for International Application No. PCT/JP2017/006495 dated May 23, 2017, 4 pages, Japan.

*Primary Examiner* — Natalie Huls
(74) *Attorney, Agent, or Firm* — Thorpe North & Western

(57) ABSTRACT

An impact test method and an impact test device is provided, wherein an impact application member is caused to fall freely onto a test sample placed on a placement platform. When the impact application member collides with the test sample, an impact force applied to the test sample and an indentation amount of the impact application member with respect to the test sample are measured by a load meter and a displacement meter, respectively. Based on the measured impact force and the measured indentation amount, a calculation unit calculates energy loss absorbed by the test sample when the impact application member and the test sample collide with each other.

5 Claims, 8 Drawing Sheets

(51) Int. Cl.
  *G01N 3/40*      (2006.01)
  *B65G 15/32*     (2006.01)

(56)          References Cited

U.S. PATENT DOCUMENTS

| | | | | |
|---|---|---|---|---|
| 4,565,089 | A * | 1/1986 | Arciszewski | G01N 11/10 |
| | | | | 73/12.13 |
| 7,219,531 | B2 * | 5/2007 | Hammons | A41D 19/01523 |
| | | | | 73/12.13 |
| 10,184,857 | B2 * | 1/2019 | Hou | G01M 7/08 |
| 10,221,019 | B2 * | 3/2019 | Hou | B65G 43/02 |
| 10,625,942 | B2 * | 4/2020 | Hou | B65G 15/32 |
| 2004/0040369 | A1 * | 3/2004 | Hoo Fatt | G01N 3/30 |
| | | | | 73/12.01 |
| 2012/0118071 | A1 * | 5/2012 | Doble | G01N 3/40 |
| | | | | 73/788 |
| 2014/0047898 | A1 * | 2/2014 | Garcia-Romeu Martinez | G01N 3/303 |
| | | | | 73/12.06 |
| 2016/0377518 | A1 * | 12/2016 | Puchnin | G01B 7/003 |
| | | | | 73/12.09 |
| 2017/0292895 | A1 | 10/2017 | Hou | |
| 2017/0370815 | A1 * | 12/2017 | Taylor | A41D 19/01523 |
| 2019/0310175 | A1 * | 10/2019 | Hou | G01N 3/56 |

FOREIGN PATENT DOCUMENTS

| | | |
|---|---|---|
| JP | H10-260123 | 9/1998 |
| JP | 2008-224632 | 9/2008 |
| JP | 2012-189533 | 10/2012 |
| WO | WO 2016-042999 | 3/2016 |

* cited by examiner

3 # IMPACT TEST METHOD AND DEVICE IN WHICH AN IMPACT APPLICATION MEMBER IS CAUSED TO FALL FREELY ONTO AND COLLIDE WITH A TEST SAMPLE

TECHNICAL FIELD

The present technology relates to an impact test method and an impact test device and more particularly relates to an impact test method and an impact test device, which are capable of determining the shock resistance matching that in actual use conditions of a target object such as a conveyor belt.

BACKGROUND ART

Various objects, including mineral resources such as iron ore and limestone, are conveyed by a conveyor belt. When the objects to be conveyed are fed onto an upper cover rubber of the conveyor belt, the upper cover rubber is subject to impact, and when surfaces of the objects to be conveyed are sharp, a surface of the upper cover rubber sometimes sustains cut damage. Shock resistance of the upper cover rubber depends on, for example, rubber characteristics and operating environment.

Hitherto, there have been proposed various methods of evaluating shock resistance of a target object (see, for example Japan Patent Publication No. 2008-224632). Underlying the method described in Japan Patent Publication No. 2008-224632 is that a falling weight is caused to collide with and damage (penetrate) a test piece. Meanwhile, as for the target object such as the conveyor belt during general actual use, the objects to be conveyed being fed do not easily penetrate and damage the target object. That is, the method proposed in Japan Patent Publication No. 2008-224632 does not correspond to actual use conditions of the target object such as the conveyor belt. Thus, shock resistance during the actual use cannot sufficiently be determined.

SUMMARY

The present technology provides an impact test method and an impact test device, which are capable of determining shock resistance matching that in actual use conditions of a target object such as a conveyor belt.

An embodiment of the present technology is an impact test method, in which an impact application member is caused to fall freely onto and collide with a test sample, the impact test method including: measuring an impact force applied to the test sample when the impact application member caused to fall freely collides with the test sample and an indentation amount of the impact application member in the test sample; and calculating, based on the impact force and the indentation amount that are measured, energy loss absorbed by the test sample when the impact application member and the test sample collide with each other.

Another embodiment of the present technology is an impact test device, including: an placement platform on which a test sample is placed; an impact application member caused to fall freely onto the test sample placed on the placement platform; a load meter configured to measure an impact force applied to the test sample; a displacement meter configured to measure an indentation amount of the impact application member with respect to the test sample; and a calculation unit to which measurement data obtained by the load meter and measurement data obtained by the displacement meter are input; the calculation unit being configured to calculate energy loss absorbed by the test sample when the impact application member and the test sample collide with each other based on an impact force and an indentation amount measured by the load meter and the displacement meter, respectively, when the impact application member caused to fall freely collides with the test sample.

According to the present technology, based on the impact force applied to the test sample in a process in which the impact application member caused to fall freely collides with the test sample and the indentation amount of the impact application member with respect to the test sample, the energy loss absorbed by the test sample is calculated. Thus, the energy loss corresponding to that in actual use of a target object such as a conveyor belt can be determined. Further, the energy loss closely relates to shock resistance of the target object. Thus, based on the calculated energy loss, the shock resistance matching that in actual use conditions of the target object can be determined with a high accuracy.

DETAILED DESCRIPTION

Figure 6:
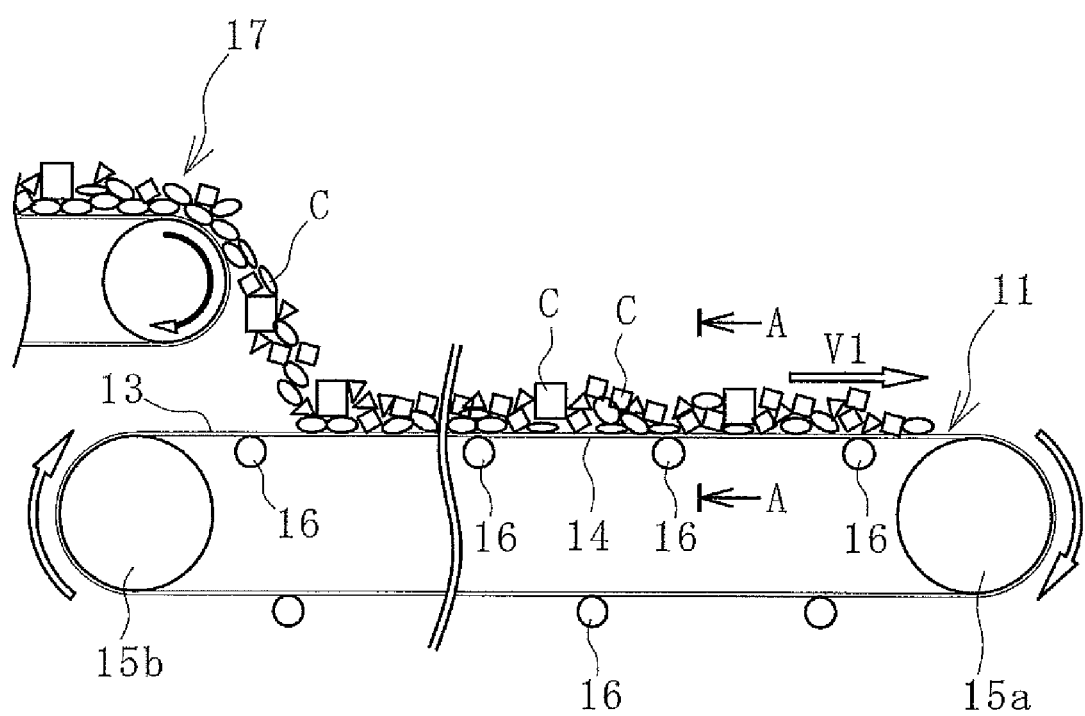
FIG. 6 is an explanatory diagram illustrating a conveyor belt line in a simplified manner.

An impact test method and an impact test device according to embodiments of the present technology will be described below with reference to the drawings. In the embodiments, examples are described in which an upper cover rubber of a conveyor belt is the target object subjected to evaluation of shock resistance. In a conveyor belt line illustrated in FIG. 6, objects to be conveyed C conveyed by another conveyor belt 17 are fed onto a conveyor belt 11 and conveyed to a conveying destination by this conveyor belt 11. The object to be conveyed C may be fed onto the conveyor belt 11 by a hopper and the like. The conveyor belt 11 is stretched at a prescribed tension between pulleys 15*a* and 15*b*.

Figure 7:
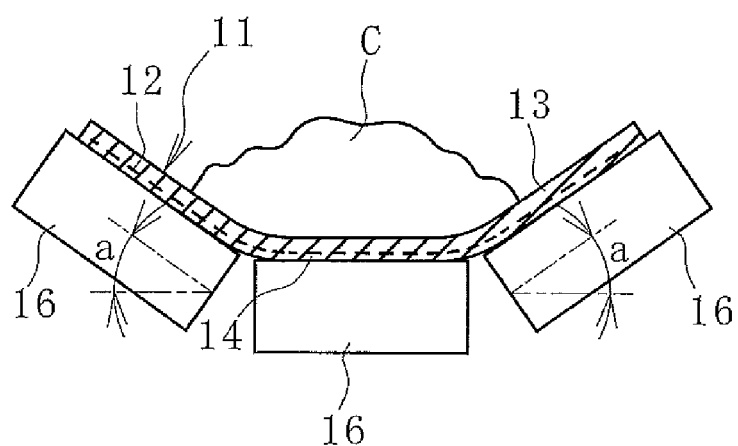
FIG. 7 is a cross-sectional view taken along the line A-A of FIG. 6.

As illustrated in FIG. 7, the conveyor belt 11 includes a core layer 12 formed of a core, such as canvas or steel cords, and an upper cover rubber 13 and a lower cover rubber 14 that sandwich the core layer 12 therebetween. The core layer 12 is a member bearing the tension that causes the conveyor belt 11 to be stretched. The lower cover rubber 14 is supported by a support roller 16 on a carrier side of the conveyor belt 11, and the upper cover rubber 13 is supported by the support roller 16 on a return side of the conveyor belt 11. Three of the support rollers 16 are arranged on the carrier side of the conveyor belt 11 in the belt width direction. The conveyor belt 11 is supported by these support rollers 16 in a concave shape having a prescribed trough angle a. When the pulley 15a on a drive side is rotationally driven, the conveyor belt 11 is operated in one direction at a prescribed traveling speed V1. The objects to be conveyed are fed onto the upper cover rubber 13, and are loaded on the upper cover rubber 13 and conveyed.

Figure 8:
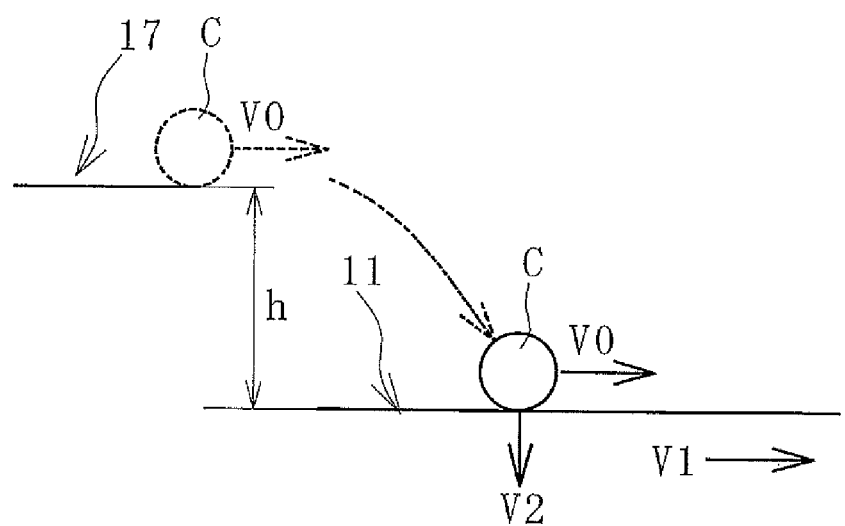
FIG. 8 is an explanatory diagram illustrating speed of an object to be conveyed at the time of collision with the conveyor belt.

In this conveyor belt line, as illustrated in FIG. 8, the conveyor belt 11 and the other conveyor belt 17 are arranged so as to have a vertical difference h therebetween. On the other conveyor belt 17, the objects to be conveyed C are conveyed at a horizontal direction speed V0 (V0<V1). In the moment when the object to be conveyed C being fed from the other conveyor belt 17 collides with the conveyor belt 11, the object to be conveyed C is at the horizontal direction speed V0. The vertical direction speed of the object to be conveyed C is accelerated from 0 to V2. The vertical direction speed V2 equals to $(2 gh)^{1/2}$. Therefore, the actual collision speed Vr at which the object to be conveyed C collides with the upper cover rubber 13 of the conveyor belt 11 satisfies $(V0^2+V2^2)^{1/2}=(V0^2+2 gh)^{1/2}$. "g" indicates gravitational acceleration. When the object to be conveyed C having fallen freely as described above collides with the upper cover rubber 13, impact energy E applied to the upper cover rubber 13 equals to Mgh. "M" indicates a mass of the object to be conveyed C.

The upper cover rubber 13 absorbs a prescribed proportion of the impact energy E. The amount of energy absorbed by the upper cover rubber 13 (energy loss E1) depends on types of rubber. The amount of energy loss E1 absorbed and the shock resistance of a specific rubber type have an interrelationship. Thus, through calculation of the energy loss E1, the shock resistance of a specific rubber type can be determined.

Figure 1:
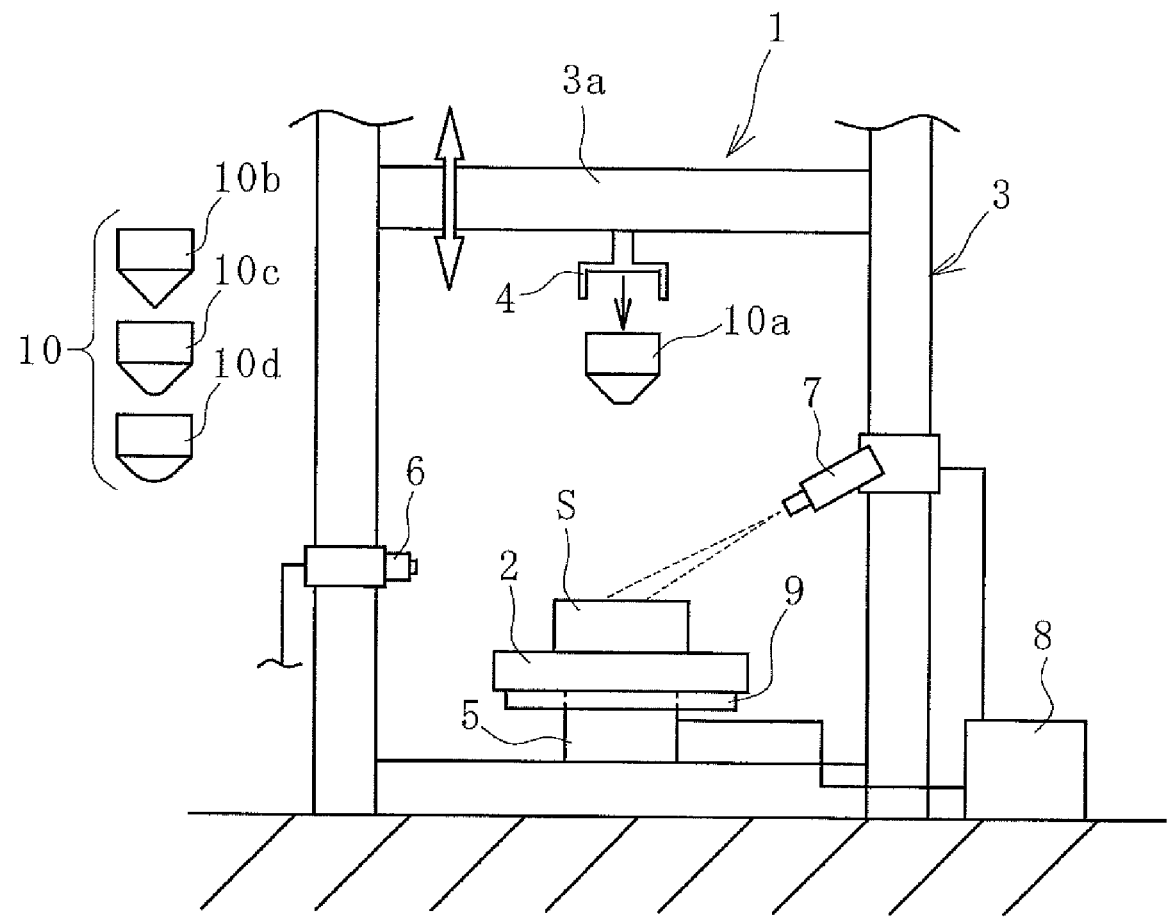
FIG. 1 is an explanatory diagram illustrating a basic structure of an impact test device.

As illustrated in FIG. 1, an impact test device 1 according to the present technology includes a placement platform 2 on which a test sample S is placed, an impact application member 10 caused to fall freely onto the test sample S, a load meter 5, a displacement meter 6, and a calculation unit 8. In this embodiment, the impact test device 1 further includes a temperature sensor 7 and a temperature regulator 9. The test sample S is an article equivalent to a member to be actually used as a target object subjected to evaluation of shock resistance (upper cover rubber 13).

The impact application members 10 preferably include a plurality of types of impact application members 10a, 10b, 10c, and 10d having different characteristics in terms of shape of lower end and weight. Among the plurality of types of features, the impact application member 10 having the characteristics similar to that of the object to be conveyed C that applies an impact on the upper cover rubber 13 during the actual use is selected.

The impact test device 1 has a configuration in which, a beam portion 3a extends within the frame 3 that is in an upright state, and a holding mechanism 4 is provided on the beam portion 3a; the beam portion 3a can be moved to a discretionary height position and be fixed; and when the impact application member 10a removably held by the holding mechanism 4 is released from a held state, the impact application member 10a falls freely onto the test sample S placed on the placement platform 2 having a flat plate shape.

Figure 2:
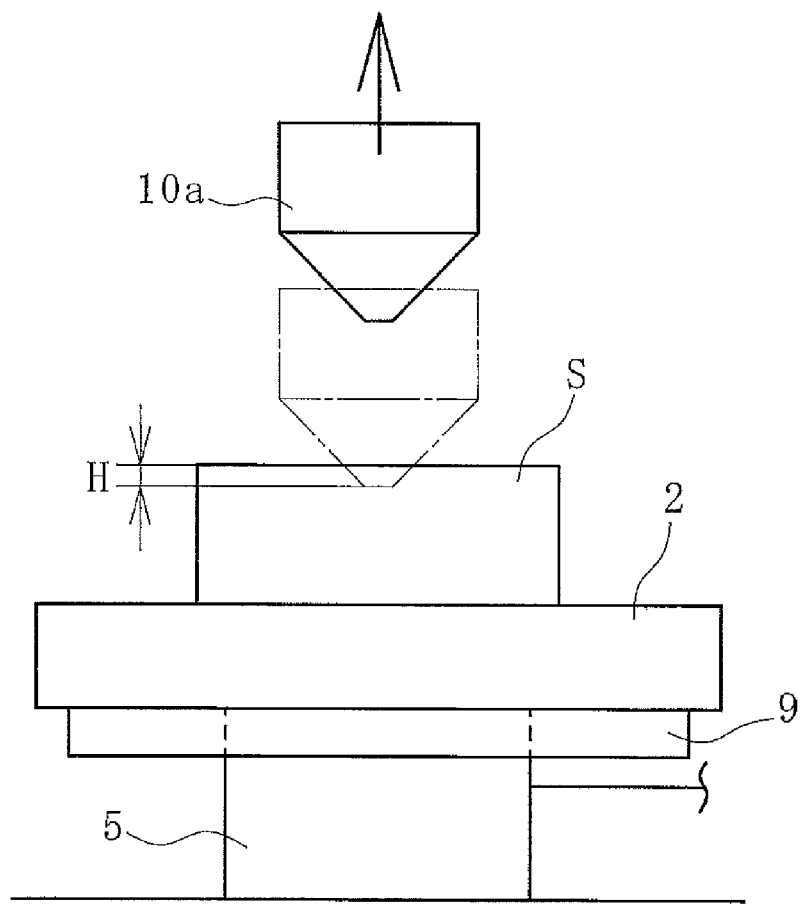
FIG. 2 is an explanatory diagram schematically illustrating a test sample deformed by an impact application member caused to fall freely.

The load meter 5 is installed below the placement platform 2, and measures an impact force applied on the test sample S. As illustrated in FIG. 2, the displacement meter 6 measures an indentation amount H of the impact application member 10a having fallen freely onto and collided with the test sample S. When the impact application member 10a has a lower end having a sharp shape, the indentation amount H corresponds to a scratch depth. Measurement data obtained by the load meter 5 and the displacement meter 6 are input to the calculation unit 8. As the calculation unit 8, for example, a computer of any type can be used.

The temperature sensor 7 measures a surface temperature of the test sample S. The surface temperature measured by the temperature sensor 7 is input to the calculation unit 8. As the temperature sensor 7, for example, a thermography can be used.

The temperature regulator 9 sets a temperature of the test sample to a discretionary temperature by heating or cooling the test sample S. In this embodiment, the temperature regulator 9 installed on a lower surface of the placement platform 2 heats or cools the placement platform 2. In this manner, the test sample S is indirectly heated and cooled to be set to a discretionary temperature. In place of the temperature regulator 9, for example, a thermostatic case, which covers the entire test device with a cover and is capable of setting the inside of the cover to a discretionary ambient temperature, can be used.

Next, the process of a test method using the impact test device 1 will be described.

The test sample S is placed on the placement platform 2 illustrated in FIG. 1. Among the plurality of types of the impact application members 10, the impact application member 10a that is suitable for and similar to the actual use conditions of the conveyor belt 11 is selected, and is mounted to the holding mechanism 4. Further, the beam portion 3a is moved so that the impact application member 10 is set to a suitable height position (for example, a position of a height h from the surface of the test sample S). The temperature regulator 9 sets the sample S to have a prescribed temperature.

Next, the impact application member 10 is released from a held state by the holding mechanism 4, and is caused to fall freely to collide with the test sample S. In this case, the impact energy E applied by the impact application member 10 having fallen freely from the position of the height h from the surface of the test sample S equals to Mgh (E=Mgh). Here, "M" indicates a known mass of the impact application member 10.

The impact application member having fallen freely is brought into contact with the test sample, and rebounds away from the test sample. In this collision process from the contact state to the away state, the load meter 5 successively measures an impact force applied to the test sample S. Further, the displacement meter 6 successively measures the indentation amount H of the impact application member 10 with respect to the test sample S, which is illustrated in FIG. 2. The impact force measured by the load meter 5 and the indentation amount H measured by the displacement meter 6 are input to the calculation unit 8.

Figure 3:
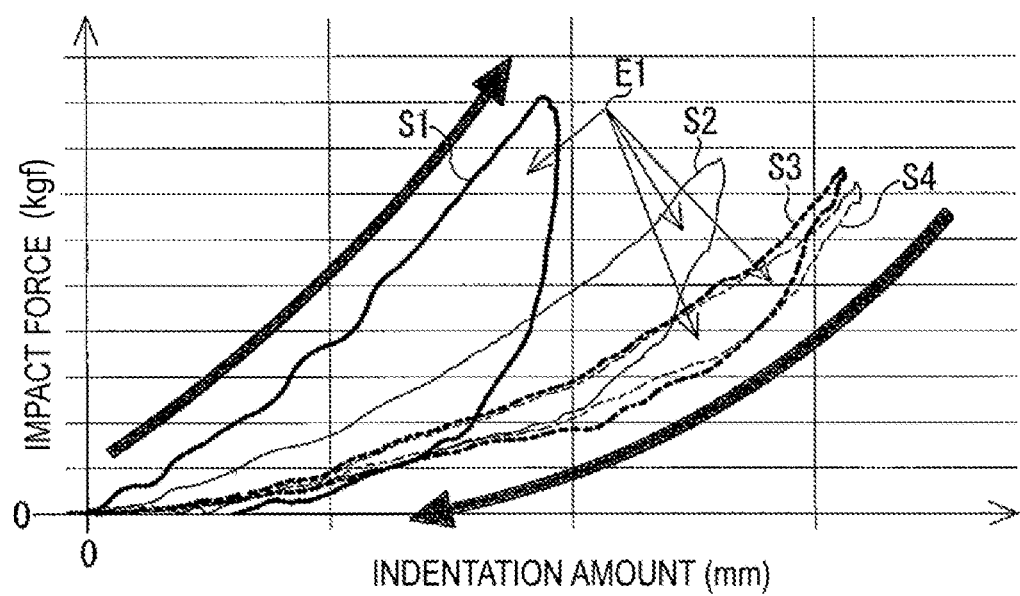
FIG. 3 is a graph showing a relationship between impact force and indentation amount at room temperature.
Figure 4:
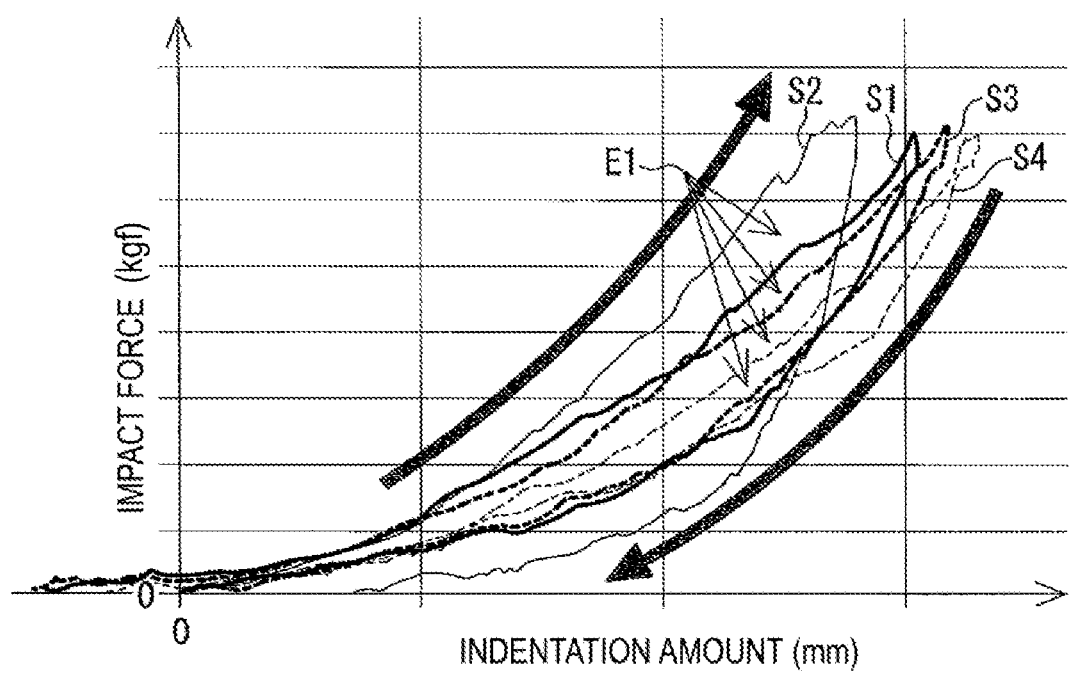
FIG. 4 is a graph showing a relationship between impact force and indentation amount at a temperature of 70° C.

As illustrated in FIGS. 3 and 4, the impact force and the indentation amount H are measured by the impact test. Four types of test samples S (S1 to S4) are subjected to the measurement under the same test conditions at room temperature (case where the test samples S have a temperature of approximately 20° C.). In FIG. 3, the measurement data of this case are shown. The four types of test samples S (S1 to S4) are changed only in temperature and set to have a temperature of 70° C. In FIG. 4, the measurement data of this case are shown.

Based on the input measurement data, the calculation unit 8 calculates the energy loss E1 absorbed by the test sample S when the impact application member 10 and the test sample S collide with each other. In FIGS. 3 and 4, the range in which data curves of the respective test samples S extend upward to the right indicates a relationship between the impact force and the indentation amount H from the time when the impact application member 10 is brought into contact with the test sample S to the time when the impact application member 10 indents the test sample S to the deepest degree. Thus, by integrating the data curves in this range, indentation energy E2 can be calculated.

The range in which these data curves extend downward to the left indicates the relationship between the impact force and the indentation amount H from the time when the impact application member 10 indents the test sample S to the deepest degree to the time when the impact application member 10 rebounds away from the test sample S. Thus, by integrating the data curves in this range, repulsive energy E3 can be calculated.

Therefore, by subtracting the repulsive energy E3 from the indentation energy E2, the energy loss E1 absorbed by the test sample S can be calculated (E1=E2−E3). That is, in FIGS. 3 and 4, the areas surrounded by the respective data curves S1, S2, S3, and S4 equal to the energy loss E1 of the respective test samples S.

In an embodiment of the present technology, a ratio (E1/E) of the energy loss E1 absorbed by the test sample S to the impact energy E applied by the impact application member 10 can be determined. This ratio (E1/E) depends on the rubber type (particularly, viscoelastic characteristics), and closely relates to shock resistance of rubber. In view of the above, data relating to an interrelationship between this ratio (E1/E) and the shock resistance of rubber are collected to form a database. Based on the database and the calculated energy loss E1, the shock resistance matching that in actual use conditions of a target object (conveyor belt 11) can be determined with a high accuracy. Further, through comparison between the data in FIGS. 3 and 4, it is understood that the energy loss E1 depends on a temperature of the test sample S. Therefore, the test samples S are changed in temperature at a plurality of levels, and are subjected to the impact test so that the above-mentioned respective measurement data are obtained. With this, temperature dependency of the energy loss E may be determined. Specifically, the database may be formed for each temperature of the test samples S. With this, through use of the database of a temperature condition that matches with an environmental temperature for use of the conveyor belt 11, the shock resistance matching that in the actual use conditions of the target object (conveyor belt 11) can be determined with a higher accuracy.

Figure 5:
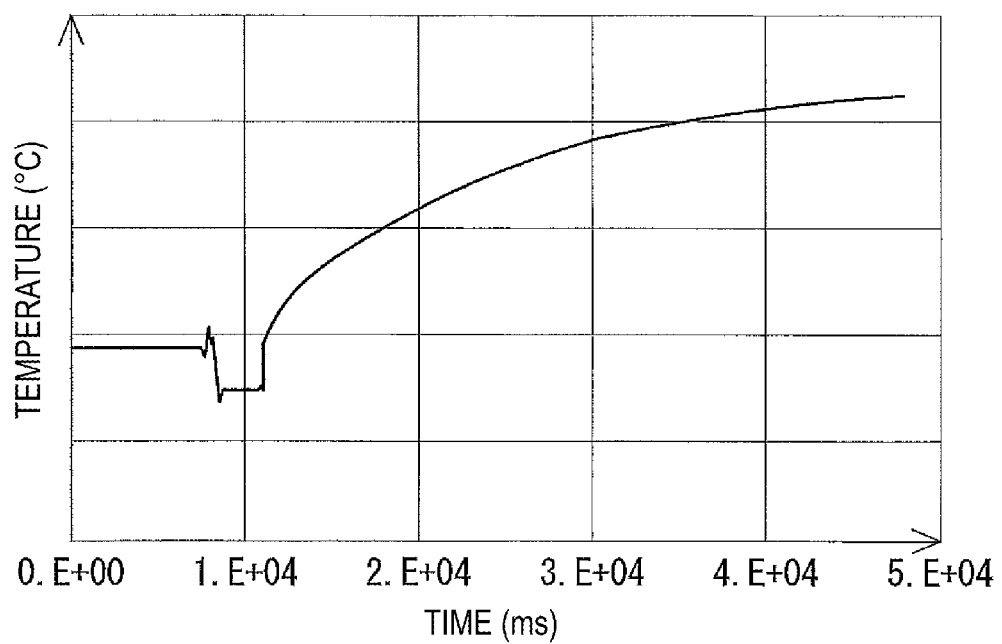
FIG. 5 is a graph showing change over time of a surface temperature of the test sample.

In this embodiment, the temperature sensor 7 can successively measure the surface temperature of the test sample S immediately after the impact application member 10 rebounds. The surface temperature measured by the temperature sensor 7 is input to the calculation unit 8. As illustrated in FIG. 5, the surface temperature of the test sample having at room temperature is measured, and the change over time can be determined.

Based on the measured surface temperature and the indentation amount H, the calculation unit 8 calculates thermal energy E4 generated in the test sample S when the impact application member 10 and the test sample S collide with each other. The thermal energy E4 can be calculated by an equation of E4=mcΔT. "m" indicates a mass of the test sample S increased in temperature. "c" indicates a specific heat of the test sample S. "ΔT" indicates temperature rise of the test.

From the measurement data shown in FIG. 5, the temperature rise ΔT of the test sample S generated by the collision with the impact application member 10 (maximum temperature rise ΔT) is given. The specific temperature c of the test sample S is given in advance.

The mass m of the test sample S increased in the temperature is calculated, for example, in the following manner. The displacement meter 6 measures the indentation amount H of the impact application member 10. Further, as the shape of the impact application member 10 is given in advance, a volume V of the test sample S increased in temperature is calculated by, for example, multiplying a maximum indentation amount and a maximum cross-sectional area of the portion where the impact application member 10 indents the test sample S to the deepest degree. As a specific gravity ρ of the test sample S is given in advance, the mass m of the test sample S increased in temperature can be calculated by multiplying the volume V and the specific gravity ρ. Further, by multiplying the mass m, the specific heat c, and the rise temperature ΔT, the thermal energy E4 can be calculated.

With this, a ratio (E4/E) of the thermal energy E4 converted by the test sample S to the impact energy E applied by the impact application member 10 having fallen freely can be determined. This ratio (E4/E) depends on the rubber type (particularly, viscoelastic characteristics among rubber characteristics), and closely relates to shock resistance of rubber. In view of the above, data relating to an interrelationship between this ratio (E4/E) and the shock resistance of rubber are collected to form a database. Based on the database and the calculated thermal energy E4, the shock resistance matching that in actual use conditions of a target object (conveyor belt 11) can be determined with a high accuracy.

In this embodiment, the upper cover rubber 13 of the conveyor belt 11 is taken as an example of a target object subjected to evaluation of shock resistance. However, the target object is not limited thereto. The target object is only required to be one used under such condition that various collision bodies such as stones or gravel collide and rebound and that is not easily penetrated the collision bodies. Specifically, in addition to the upper cover rubber 13, the lower cover rubber 14 of the conveyor belt 11, a rubber member such as tread rubber of a tire, the core layer 12 of the conveyor belt 11, or other members can be exemplified as the target object.

The invention claimed is:

1. An impact test method, in which an impact application member is caused to fall freely onto and collide with a test sample, the impact test method comprising:
    measuring an impact force applied to the test sample when the impact application member caused to fall freely collides with the test sample and an indentation amount of the impact application member in the test sample;
    calculating, based on the impact force and the indentation amount that are measured, energy loss absorbed by the test sample when the impact application member and the test sample collide with each other;
    measuring a surface temperature of the test sample with which the impact application member collides; and
    calculating, based on the surface temperature and the indentation amount that are measured, thermal energy generated in the test sample when the impact application member and the test sample collide with each other; wherein:

the energy loss absorbed by the test sample is calculated by subtracting repulsive energy from indentation energy;

the indentation energy is calculated, based on the impact force and the indentation amount that are measured, by integrating over a range in a relationship between the impact force and the indentation amount from a time when the impact application member is brought into contact with the test sample to a time when the impact application member indents the test sample to a deepest degree; and the repulsive energy is calculated, based on the impact force and the indentation amount that are measured, by integrating over a range in the relationship between the impact force and the indentation amount from the time when the impact application member indents the test sample to the deepest degree to a time when the impact application member rebounds away from the test sample.

2. The impact test method according to claim 1, wherein the impact test is conducted under different temperature conditions.

3. The impact test method according to claim 1, wherein rubber is used as the test sample.

4. An impact test device, comprising:

a placement platform on which a test sample is placed;

an impact application member caused to fall freely onto the test sample placed on the placement platform;

a load meter configured to measure an impact force applied to the test sample;

a displacement meter configured to measure an indentation amount of the impact application member with respect to the test sample;

a calculation unit to which measurement data obtained by the load meter and measurement data obtained by the displacement meter are input;

the calculation unit being configured to calculate energy loss absorbed by the test sample when the impact application member and the test sample collide with each other based on an impact force and an indentation amount measured by the load meter and the displacement meter, respectively, when the impact application member caused to fall freely collides with the test sample; and a temperature sensor configured to measure a surface temperature of the test sample; wherein:

based on a surface temperature of the test sample with which the impact application member collides measured by the temperature sensor and the indentation amount, the calculation unit is configured to calculate thermal energy generated in the test sample when the impact application member and the test sample collide with each other;

the energy loss absorbed by the test sample is calculated by subtracting repulsive energy from indentation energy;

the indentation energy is calculated, based on the impact force and the indentation amount that are measured, by integrating over a range in a relationship between the impact force and the indentation amount from a time when the impact application member is brought into contact with the test sample to a time when the impact application member indents the test sample to a deepest degree; and the repulsive energy is calculated, based on the impact force and the indentation amount that are measured, by integrating over a range in the relationship between the impact force and the indentation amount from the time when the impact application member indents the test sample to the deepest degree to a time when the impact application member rebounds away from the test sample.

5. The impact test device according to claim 4, further comprising a temperature regulator configured to change a temperature of the test sample.

* * * * *